July 21, 1959
E. F. SEVING
2,895,762
VEHICLE HOIST CRADLE
Filed Oct. 20, 1954
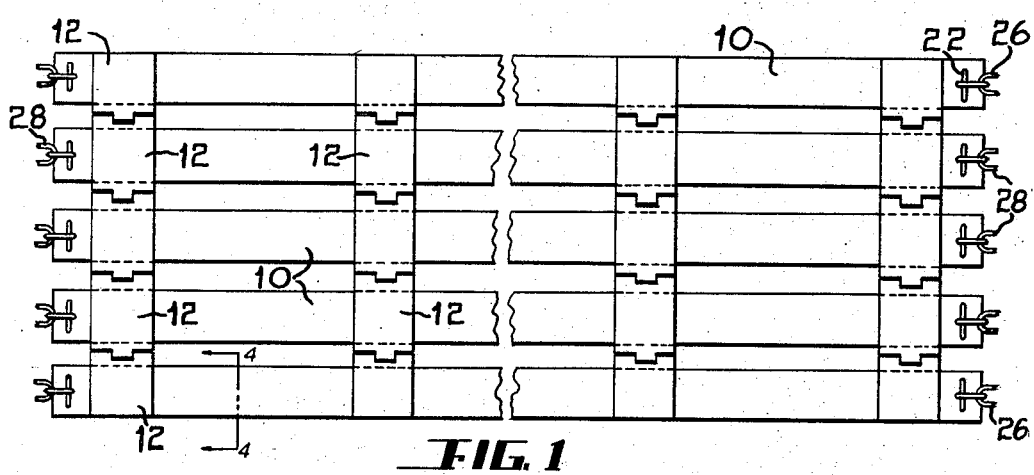
FIG. 1
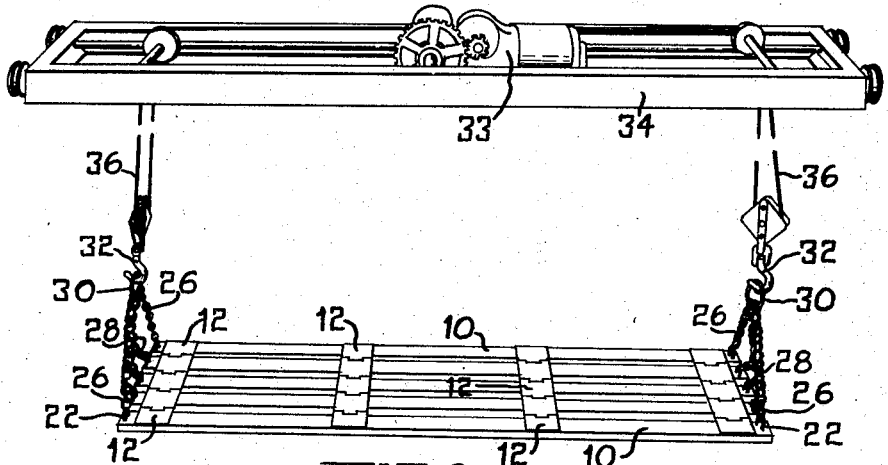
FIG. 2
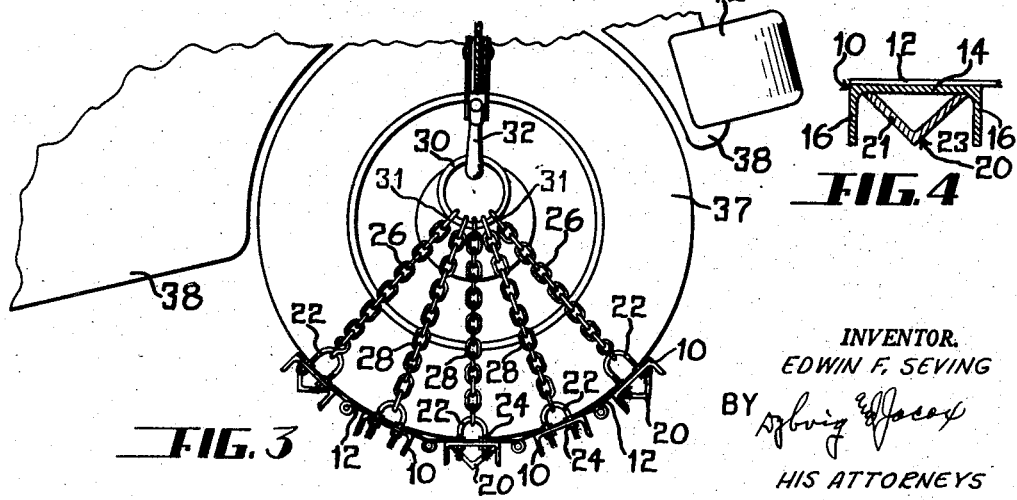
FIG. 3
FIG. 4
INVENTOR.
EDWIN F. SEVING
BY
HIS ATTORNEYS United States Patent Office 2,895,762
Patented July 21, 1959

2,895,762
VEHICLE HOIST CRADLE
Edwin F. Seving, Sidney, Ohio
Application October 20, 1954, Serial No. 463,370
6 Claims. (Cl. 294—67)

This invention relates to a hoist cradle for vehicles. The invention relates more particularly to a hoist cradle for vehicles which engages only the wheels of a vehicle.

Hoist cradles which engage only the wheels of a vehicle are employed in various applications. For example, this type of hoist cradle is used in lifting the front portion of a truck or wagon or the like for the dumping of a load therefrom.

Another application of this type of hoist cradle is that of movement of automobiles and trucks to and from a ship or other transporting vessel. In such application, a hoist cradle is positioned under the rear wheels of a vehicle and another hoist cradle is used under the front wheels thereof for lifting the entire vehicle.

In the past hoist cradles of this type have presented numerous problems due to the fact that this type of hoist cradle was not capable of maintaining its load in rigid balance. The wheels of the vehicles have had a tendency to rotate when lifted by such cradles.

Furthermore, in the past when a vehicle approachingly engaged the hoist cradle in order for the wheels thereof to be carried upon the cradle, the cradle would slidingly move as the wheels of the vehicle contacted the edge of the cradle.

Hence, an object of this invention is to provide a hoist cradle for vehicles, which hoist cradle is capable of firm support of the wheels of the vehicle so that the wheels of the vehicle thus supported are securely settled within the cradle and do not tend to rotate.

Another object of this invention is to provide a hoist cradle having means preventing the skidding of the hoist cradle as the cradle is contacted by the engaging wheels of a vehicle.

Another object of this invention is to provide a hoist cradle which has great rigidity and strength even though it is capable of flexibly assuming a nesting position for the wheels of a vehicle.

Another object of this invention is to provide a hoist cradle for vehicles which is easily and readily adjustable to accommodate various sizes of wheels.

Other objects and advantages reside in the construction of parts, the combination thereof and the mode of operation, as will become more apparent from the following description.

In the drawing, Figure 1 is a top plan view of the channel members of a hoist cradle of this invention when the channel members are supported upon a flat surface.

Figure 2 is a perspective view showing the hoist cradle of this invention when the channel members thereof are supported upon a flat surface.

Figure 3 is a fragmentary side elevational view showing a wheel of a vehicle being supported by a hoist cradle of this invention.

Figure 4 is a sectional view taken substantially on line 4—4 of Figure 1.

Referring to the drawing in detail, a hoist cradle of this invention comprises a series of elongate channel members 10 hingedly attached one to the other in parallel relation by means of a plurality of hinged plate members 12. Each channel member 10 comprises a flat plate or web 14 having flanges 16 extending therefrom and normal thereto.

As best shown in Figures 3 and 4, some of the channel members 10 have attached thereto an L-shaped angle bar or member 20 comprising normally disposed legs 21 and 23. The ends of the legs 21 and 23 are attached to the web 14 so that the juncture of the legs or the vertex of the L-shaped angle bar is intermediate the flanges 16 of the channel 10. The legs of the L-shaped angle bar 20 are preferably equal in length and are of such length that the juncture of the legs or vertex of the angle extends even with the ends of the flanges 16 of the web 14, as best shown in Figure 4.

A plurality of U-shaped clamps or bolts 22 are attached to the channel members 10, there being a pair of U-bolts 22 attached to each channel member 10, one U-bolt being disposed at each end of the channel member. Each clamp or bolt 22 extends through the web 14 and is adjustably attached thereto by means of nuts 24 which are threaded upon the U-shaped clamp 22 on each side of the web 14.

Attached to each of the U-shaped clamp members 22 is a support chain member. The chain members are herein designated by reference numerals 26 and 28. One end of each chain member is attached to its respective U-shaped clamp member. Thus, there is a group of chain members 26 and 28 at each longitudinal end of the series of channel members 10. Each group of chain members 26 and 28 connects the channel members 10 to a hoist ring 30, there being one hoist ring at each longitudinal end of the series of channel members 10. An end link 31 at the end of each chain 26 and 28 attaches the chain to the ring 30. It has been found preferable that the end links 31 of the chains 26 and 28 be pear-shaped; however, end links of other shapes in these chains have been found suitable. It is also to be understood that the chains 26 and 28 may be replaced by any suitable cable members or other elongate flexible members.

Each of the hoist rings 30 is adapted to receive a hook member 32 which is a part of any suitable winch device 33 provided with a frame 34 and a cable 36.

The hoist cradle is lifted by the winch 33. The hoist cradle of this invention is adapted to support wheels 37 of a typical vehicle 38. The vehicle 38 is shown as being provided with a bumper member 42.

The flange portions 16 of the channel members 10 are comparatively short with respect to the web members 14 so that the web members 14 are not greatly elevated above the ground or floor surface when the series of channel members 10 are laid out flat, as shown in Figures 1 and 2, for the receipt of the wheels 37 of the vehicle 38. Thus, the wheels 37 of the vehicle 38 need rise only slightly as they roll from the ground or floor surface to the web portions 14 of the channel members 10. Furthermore, as stated above, the angle bar 20 has the vertex thereof even with the ends of the flanges 16 of the channel members 10. Thus, the vertex portion of the angle bar 20 contacts the ground or floor member, along with the flanges 16. Thus, there are three lines of contact rather than two, providing resistance against sliding movement of the channel members 10. Therefore, the channel members 10 will not slide upon the ground or floor as the vehicle wheels 37 approachingly engage and move on to the channel members 10 to be supported thereby.

As clearly shown in Figure 3, the chains 26 which are attached to the outermost channel members 10 are shorter than the chains 28 due to the fact that the chains 26 are provided with fewer links than the chains 28. For this reason, each of the channel members 10 supports substantially the same load when the wheels are in hoisted position. Furthermore, as a result of the arrangement of the chain members of various lengths and the pivotal attachment among the channel members, the group of rigid parallel channel members easily and readily assume firm engagement with the wheel 37 which are supported by the cradle.

The nuts 24 threaded upon the U-bolts 22 also provide an adjustment means for adjusting the load on each individual chain member 26 or 28. This adjustment of the U-bolts 22 also provides means for adjusting the position of the hoist ring 30 with respect to the channel members 10, so that wheels of various sizes may be firmly retained by the hoist cradle.

As best shown in Figure 3, the chains 26 and 28 are of sufficient length so that the ring 30 is slightly above the center of the wheel 37 when the wheels of the vehicle are supported by the hoist cradle. By such an arrangement, the wheels are firmly supported by the hoist cradle so that the wheels do not tend to revolve as they are supported by the hoist cradle. Hence, the wheels of the vehicle are securely nested within the hoist cradle.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A support device for a vehicle wheel comprising a series of rigid elongate channel members, each of the channel members being provided with a web member having a pair of flanges extending therefrom, rigid hinge members attached to the web members maintaining the channel members in parallel closely spaced relation, a right angle bar extending substantially the length of one of the channel members and attached thereto, the right angle bar being attached to the channel member intermediate the flanges thereof so that the vertex of the angle bar is disposed in the same plane with the longitudinal edges of the flanges, and flexible members attached to each of the channel members for support thereof, the flexible members which are attached to the two channel members which are disposed at the ends of the series of channel members being shorter in length than the flexible members attached to the channel members which are intermediate the ends of the series, the arrangement of the flexible members being such that they are successively longer from the ends of the series toward the center of the series, there being a lower portion of each of the flexible members attached to a channel member, and means attaching the upper end of the flexible members one to the other, the flexible members being attached to the web members of the channel members so that web members are uppermost and are engaged by the vehicle wheel.

2. A support device for a vehicle wheel comprising a series of rigid elongate channel members, rigid hinge plates attaching and maintaining the channel members in parallel closely spaced relation, the channel members being adapted to pivotally move one with respect to another to form an elongate arcuate cradle, each of the channel members being provided with a web member having a pair of flanges extending therefrom, a right angle bar extending substantially the length of one of the channel members and attached thereto intermediate the flanges thereof so that the vertex of the angle member is disposed in the same plane with the longitudinal edges of the flanges, and flexible members attached to each of the channel members for support thereof, the flexible members being attached to the channel members so that in each channel member the web member is uppermost and is engaged by the vehicle wheel, the series of channel members having two end channel members, there being one end channel member at each end of the series of channel members, the flexible members which are attached to the two end channel members of the series of channel members being shorter in length than the flexible members attached to the channel members which are intermediate the two end channel members of the series, the arrangement of flexible members being such that they are successively longer from the end channel members toward the channel members at the center of the series, one portion of each flexible member being attached to a channel member, and means attaching an opposite portion of the flexible members one to the other.

3. A hoist cradle for a vehicle wheel comprising a plurality of channel members, rigid hinge members attaching the channel members one to the other in parallel closely spaced relation, each of the channel members being provided with a web member having a pair of flanges extending therefrom, an angle bar attached to the web member of one of the channel members and intermediate the flanges thereof so that the vertex of the angle bar is in the same plane with the longitudinal edges of the flanges, and flexible members attached to the web member of each of the channel members for support thereof, the series of channel members having two end channel members, there being one end channel member at each end of the series of channel members, the flexible members which are attached to the end channel members being shorter in length than the flexible members which are attached to the channel members which are intermediate the end channel members, the arrangement of flexible members being such that they are successively longer from the end channel members toward channel members at the center of the series, there being a lower portion of each flexible member attached to a channel member, there being a group of flexible members at each end of the channel members, and means attaching together an upper portion of the flexible members of each group of flexible members, the flexible members being attached to the web members of the channel members so that in each channel member the web member is uppermost and is engaged by the vehicle wheel.

4. In a structure for lifting wheels of a vehicle, the combination comprising a series of substantially equi-length channel members, a plurality of hinge members pivotally attaching the channel members one to the other in parallel closely spaced relationship, a plurality of U-bolts, there being a U-bolt attached to each of the channel members adjacent each end thereof, a plurality of elongate flexible members, each flexible member having one end thereof attached to a U-bolt, there being one flexible member attached to each U-bolt, a pair of hoist rings, there being a hoist ring adjacent each end of the channel members, the other end of each flexible member being attached to one of the pair of hoist rings, the flexible members at one end of the channel members being attached to one hoist ring and the flexible members at the other end of the channel members being attached to the other hoist ring, the channel members being adapted to support a portion of a vehicle as the wheels thereof are carried by the channel members, the series of channel members having two end channel members, there being one end channel member at each end of the series of channel members, the flexible members which are attached to the end channel members being shorter in length than the flexible members attached to the channel members which are intermediate the end channel members, the arrangement of flexible members being such that they are successively longer from the end channel members toward the channel members at the center of the series, the flexible members being of such lengths that the hoist rings are positioned slightly above the center of the wheels supported by the channel members.

5. In a support device for the wheels of a vehicle, the combination comprising a series of rigid elongate channel members, rigid hinge plates pivotally attaching and maintaining the channel members in closely spaced parallel relation, the channel members being adapted to pivotally move one with respect to another to form a flat receiving surface for the wheels of a vehicle and to pivotally move one with respect to another to form an elongate cradle for the wheels of a vehicle, each of the channel members being provided with a web portion having a pair of flanges extending therefrom, the web portion of each of the channel members being adapted to engage the wheels of a vehicle supported thereby, a plurality of angle bars substantially the length of the channel members, some of the channel members having an angle bar attached individually thereto, the angle bar extending substantially the length of the channel member and attached thereto intermediate the flanges thereof, the vertex of the angle bar being in the same plane with the longitudinal edges of the flanges, a plurality of flexible members attached to the channel members, there being one flexible member attached to each end of each channel member for support thereof, the series of channel members having two end channel members, there being one end channel member at each end of the series of channel members, the flexible members which are attached to the end channel members being shorter in length than the flexible members attached to the channel members which are intermediate the end channel members, the arrangement of flexible members being such that they are successively longer from the end channel members of the series toward the channel members at the center of the series, the upper ends of the flexible members being adjacent the center of the wheels supported by the channel members, and means attaching said upper ends of the flexible members at each end of the channel members one to the other.

6. In a support device having a pair of hoist ring members and adapted to support the wheels of a vehicle, a series of rigid elongate channel members, rigid hinge plates attaching and maintaining the channel members in closely spaced parallel relation, the channel members being adapted to pivotally move one with respect to another to form a flat receiving surface for the wheels of a vehicle and to pivotally move one with respect to another to form an elongate cradle for support of the wheels of a vehicle along a portion of the periphery thereof, each of the channel members being provided with a web portion having a pair of flanges extending therefrom, the web portion of each of the channel members being adapted to engage the wheels of a vehicle supported thereby, an angle bar extending substantially the length of the channel member and attached thereto intermediate the flanges thereof so that the vertex of the angle of the bar is disposed in a common plane with the longitudinal edges of the flanges, a plurality of elongate flexible support members, there being a pair of the flexible members attached to each of the channel members, there being one flexible member attached adjacent each end of each channel member for support thereof, all of the flexible members at one end of the channel members being attached to one of the hoist ring members and all of the flexible members at the other end of the channel members being attached to the other hoist ring member, a lower portion of each flexible member being attached to the channel member and an upper portion of each flexible member being attached to a hoist ring member, the flexible members being of such lengths that each of the hoist ring members is disposed slightly above the center of the wheels supported by the channel members, the series of channel members having two end channel members, there being one end channel member at each end of the series of channel members, the flexible members which are attached to the end channel members being shorter in length than the flexible members attached to the channel members which are intermediate the end channel members, the arrangement of the flexible members being such that they are successively longer from the end channel members toward the channel members at the center of the series so that a cradle is readily formed as the wheels are lifted.

References Cited in the file of this patent

UNITED STATES PATENTS

| | | |
|---|---|---|
| 949,595 | Osterhaus | Feb. 15, 1910 |
| 1,689,170 | Farmer | Oct. 23, 1928 |
| 2,225,828 | Godschall | Dec. 24, 1940 |
| 2,290,565 | Lagana | July 21, 1942 |
| 2,296,507 | Donaldson | Sept. 22, 1942 |
| 2,550,218 | Brady | Apr. 24, 1951 |